(12) United States Patent
Mendiboure et al.

(10) Patent No.: US 8,530,015 B2
(45) Date of Patent: Sep. 10, 2013

(54) REINFORCEMENT OF HOLLOW PROFILES

(75) Inventors: Jean Mendiboure, Molsheim (FR); Eric Chopin, Molsheim (FR); Francois Crouzet, Molsheim (FR); Philippe Fahrner, Molsheim (FR); Serge Bieber, Molsheim (FR)

(73) Assignee: Zephyros, Inc., Romeo, MI (US)

( * ) Notice: Subject to any disclaimer, the term of this patent is extended or adjusted under 35 U.S.C. 154(b) by 465 days.

(21) Appl. No.: 12/161,103

(22) PCT Filed: Jan. 11, 2007

(86) PCT No.: PCT/EP2007/000214
§ 371 (c)(1),
(2), (4) Date: Dec. 21, 2010

(87) PCT Pub. No.: WO2007/082677
PCT Pub. Date: Jul. 26, 2007

(65) Prior Publication Data
US 2011/0104413 A1    May 5, 2011

(30) Foreign Application Priority Data

Jan. 17, 2006   (GB) .................................. 0600901.3

(51) Int. Cl.
*B32B 1/00*    (2006.01)
*B32B 1/08*    (2006.01)
*B32B 3/26*    (2006.01)
*B32B 7/12*    (2006.01)
*B32B 7/14*    (2006.01)
*B32B 15/092*  (2006.01)
*B60J 9/00*    (2006.01)

(52) U.S. Cl.
USPC ... 428/36.5; 428/35.7; 428/35.8; 428/355 EP; 428/316.6; 296/187.02; 296/205

(58) Field of Classification Search
USPC .................... 428/34.1, 34.4, 34.6, 34.7, 35.7, 428/35.8, 36.4, 36.5, 36.92, 355 EP, 316.6, 428/319.3; 52/731.2, 731.6, 732.1, 735.1; 296/187.02, 204, 205
See application file for complete search history.

(56) References Cited

U.S. PATENT DOCUMENTS 3,400,182 A   9/1968   Kolt
3,868,796 A   3/1975   Bush (Continued)

FOREIGN PATENT DOCUMENTS

DE   197 03 429 A1   8/1998
DE   198 12 288 C1   5/1999

(Continued)

OTHER PUBLICATIONS

Written Opinion for corresponding PCT Application No. PCT/EP2007/000214, filed Jan. 11, 2007, (Published as WO/2007/082677, on Jul. 26, 2007).

(Continued)

*Primary Examiner* — Walter B Aughenbaugh
(74) *Attorney, Agent, or Firm* — The Dobrusin Law Firm, PC

(57) ABSTRACT

A structural reinforcement comprising a hollow profile and a ribbed structure, the ribbed structure including a laminar structure of two facing sheets with a first layer of adhesive material that is foamable and located in between the two facing sheets, the ribbed structure having ribs with one or more ends and a second adhesive material that is provided over at least part of the ribs at the one or more ends to bond the ribs at the one or more ends to an interior surface of the hollow profile.

10 Claims, 5 Drawing Sheets

(56) References Cited

U.S. PATENT DOCUMENTS

| | | |
|---|---|---|
| 4,463,870 A | 8/1984 | Coburn, Jr. et al. |
| 4,610,836 A | 9/1986 | Wycech |
| 4,695,343 A | 9/1987 | Wycech |
| 4,732,806 A | 3/1988 | Wycech |
| 4,751,249 A | 6/1988 | Wycech |
| 4,769,391 A | 9/1988 | Wycech |
| 4,769,951 A | 9/1988 | Kaaden |
| 4,810,548 A | 3/1989 | Ligon, Sr. et al. |
| 4,813,690 A | 3/1989 | Coburn, Jr. |
| 4,836,516 A | 6/1989 | Wycech |
| 4,853,270 A | 8/1989 | Wycech |
| 4,861,097 A | 8/1989 | Wycech |
| 4,901,500 A | 2/1990 | Wycech |
| 4,908,930 A | 3/1990 | Wycech |
| 4,922,596 A | 5/1990 | Wycech |
| 4,923,902 A | 5/1990 | Wycech |
| 4,978,562 A | 12/1990 | Wycech |
| 4,995,545 A | 2/1991 | Wycech |
| 5,124,186 A | 6/1992 | Wycech |
| 5,194,199 A | 3/1993 | Thum |
| 5,266,133 A | 11/1993 | Hanley et al. |
| 5,288,538 A | 2/1994 | Spears |
| 5,344,208 A | 9/1994 | Bien et al. |
| 5,358,397 A | 10/1994 | Ligon et al. |
| 5,373,027 A | 12/1994 | Hanley et al. |
| 5,506,025 A | 4/1996 | Otto et al. |
| 5,575,526 A | 11/1996 | Wycech |
| 5,598,610 A | 2/1997 | Torigoe et al. |
| 5,631,027 A | 5/1997 | Takabatake |
| 5,660,116 A | 8/1997 | Dannawi et al. |
| 5,755,486 A | 5/1998 | Wycech |
| 5,819,408 A | 10/1998 | Catlin |
| 5,884,960 A | 3/1999 | Wycech |
| 5,888,600 A | 3/1999 | Wycech |
| 5,892,187 A | 4/1999 | Patrick |
| 5,894,071 A | 4/1999 | Merz et al. |
| 5,904,024 A | 5/1999 | Miwa |
| 5,937,486 A | 8/1999 | Bockenheimer |
| 5,941,597 A | 8/1999 | Horiuchi et al. |
| 5,985,435 A | 11/1999 | Czaplicki et al. |
| 5,992,923 A | 11/1999 | Wycech |
| 6,003,274 A | 12/1999 | Wycech |
| 6,006,484 A | 12/1999 | Geissbuhler |
| 6,033,300 A | 3/2000 | Schneider |
| 6,059,342 A | 5/2000 | Kawai et al. |
| 6,068,424 A | 5/2000 | Wycech |
| 6,079,180 A | 6/2000 | Wycech |
| 6,092,864 A | 7/2000 | Wycech et al. |
| 6,096,403 A | 8/2000 | Wycech |
| 6,099,948 A | 8/2000 | Paver, Jr. |
| 6,103,341 A | 8/2000 | Barz et al. |
| 6,103,784 A | 8/2000 | Hilborn et al. |
| 6,131,897 A | 10/2000 | Barz et al. |
| 6,146,565 A | 11/2000 | Keller |
| 6,149,227 A | 11/2000 | Wycech |
| 6,150,428 A | 11/2000 | Hanley, IV et al. |
| 6,165,588 A | 12/2000 | Wycech |
| 6,168,226 B1 | 1/2001 | Wycech |
| 6,189,953 B1 | 2/2001 | Wycech |
| 6,196,621 B1 | 3/2001 | VanAssche et al. |
| 6,199,940 B1 | 3/2001 | Hopton et al. |
| 6,232,433 B1 | 5/2001 | Narayan |
| 6,233,826 B1 | 5/2001 | Wycech |
| 6,237,304 B1 | 5/2001 | Wycech |
| 6,247,287 B1 | 6/2001 | Takabatake |
| 6,253,524 B1 | 7/2001 | Hopton et al. |
| 6,263,635 B1 | 7/2001 | Czaplicki |
| 6,270,600 B1 | 8/2001 | Wycech |
| 6,272,809 B1 | 8/2001 | Wycech |
| 6,276,105 B1 | 8/2001 | Wycech |
| 6,281,260 B1 | 8/2001 | Hanley, IV et al. |
| 6,296,298 B1 | 10/2001 | Barz |
| 6,303,672 B1 | 10/2001 | Papalos et al. |
| 6,305,136 B1 | 10/2001 | Hopton et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 | 12/2001 | Wycech |
| 6,341,467 B1 | 1/2002 | Wycech |
| 6,347,799 B1 | 2/2002 | Williams et al. |
| 6,348,513 B1 | 2/2002 | Hilborn et al. |
| 6,357,819 B1 | 3/2002 | Yoshino |
| 6,358,584 B1 | 3/2002 | Czaplicki |
| 6,368,438 B1 | 4/2002 | Chang et al. |
| 6,372,334 B1 | 4/2002 | Wycech |
| D457,120 S | 5/2002 | Broccardo et al. |
| 6,382,635 B1 | 5/2002 | Fitzgerald |
| 6,383,610 B1 | 5/2002 | Barz et al. |
| 6,389,775 B1 | 5/2002 | Steiner et al. |
| 6,406,078 B1 | 6/2002 | Wycech |
| 6,413,611 B1 | 7/2002 | Roberts et al. |
| 6,419,305 B1 | 7/2002 | Larsen |
| 6,422,575 B1 | 7/2002 | Czaplicki et al. |
| 6,435,601 B2 | 8/2002 | Takahara |
| H2047 H | 9/2002 | Harrison et al. |
| 6,444,713 B1 | 9/2002 | Pachl et al. |
| 6,451,231 B1 | 9/2002 | Harrison et al. |
| 6,455,146 B1 | 9/2002 | Fitzgerald |
| 6,467,834 B1 | 10/2002 | Barz et al. |
| 6,471,285 B1 | 10/2002 | Czaplicki et al. |
| 6,474,722 B2 | 11/2002 | Braz |
| 6,474,723 B2 | 11/2002 | Czaplicki et al. |
| 6,475,577 B1 | 11/2002 | Hopton et al. |
| 6,482,496 B1 | 11/2002 | Wycech |
| 6,502,821 B2 | 1/2003 | Schneider |
| 6,519,854 B2 | 2/2003 | Blank |
| 6,523,857 B1 | 2/2003 | Hopton et al. |
| 6,546,693 B2 | 4/2003 | Wycech |
| 6,561,571 B1 | 5/2003 | Brennecke |
| 6,573,309 B1 | 6/2003 | Reitenback et al. |
| 6,575,526 B2 | 6/2003 | Czaplicki et al. |
| 6,607,238 B2 | 8/2003 | Barz |
| 6,619,727 B1 | 9/2003 | Barz et al. |
| 6,634,698 B2 | 10/2003 | Kleino |
| 6,668,457 B1 | 12/2003 | Czaplicki |
| 6,691,468 B2 | 2/2004 | Helferty |
| 6,708,979 B2 | 3/2004 | Stratman et al. |
| 6,729,425 B2 | 5/2004 | Schneider et al. |
| 6,777,049 B2 | 8/2004 | Sheldon et al. |
| 6,786,533 B2 | 9/2004 | Bock et al. |
| 6,793,274 B2 | 9/2004 | Riley et al. |
| 6,811,864 B2 | 11/2004 | Czaplicki et al. |
| 6,820,923 B1 | 11/2004 | Bock |
| 6,846,559 B2 | 1/2005 | Czaplicki et al. |
| 6,851,232 B1 | 2/2005 | Schwegler |
| 6,855,652 B2 | 2/2005 | Hable et al. |
| 6,880,657 B2 | 4/2005 | Schneider et al. |
| 6,887,914 B2 | 5/2005 | Czaplicki et al. |
| 6,890,021 B2 | 5/2005 | Bock et al. |
| 6,905,745 B2 | 6/2005 | Sheldon et al. |
| 6,920,693 B2 | 7/2005 | Hankins et al. |
| 6,921,130 B2 | 7/2005 | Barz et al. |
| 6,923,499 B2 | 8/2005 | Wieber et al. |
| 6,928,736 B2 | 8/2005 | Czaplicki et al. |
| 6,932,421 B2 | 8/2005 | Barz |
| 6,938,947 B2 | 9/2005 | Barz et al. |
| 6,941,719 B2 | 9/2005 | Busseuil et al. |
| 6,953,219 B2 | 10/2005 | Lutz et al. |
| 6,955,593 B2 | 10/2005 | Lewis et al. |
| 7,025,409 B2 | 4/2006 | Riley et al. |
| 7,041,355 B2 | 5/2006 | Juras et al. |
| 7,097,794 B2 | 8/2006 | McLeod et al. |
| 7,114,763 B2 | 10/2006 | Riley et al. |
| 7,141,194 B1 | 11/2006 | Beackmann |
| 7,160,491 B2 | 1/2007 | Barz et al. |
| 2001/0020794 A1 | 9/2001 | Ishikawa |
| 2001/0039780 A1 | 11/2001 | Matsuki et al. |
| 2001/0042353 A1 | 11/2001 | Honda et al. |
| 2002/0033618 A1 | 3/2002 | Kwon |
| 2002/0074827 A1 | 6/2002 | Fitzgerald et al. |
| 2003/0001469 A1 | 1/2003 | Hankins et al. |
| 2003/0050352 A1 | 3/2003 | Guenther et al. |
| 2003/0140671 A1 | 7/2003 | Lande et al. |
| 2003/0176128 A1 | 9/2003 | Czaplicki et al. |

| | | | |
|---|---|---|---|
| 2003/0183317 A1 | 10/2003 | Czaplicki et al. | |
| 2003/0184121 A1 | 10/2003 | Czaplicki et al. | |
| 2003/0201572 A1 | 10/2003 | Coon et al. | |
| 2003/0218019 A1 | 11/2003 | Le Gall et al. | |
| 2004/0018341 A1 | 1/2004 | Richardson et al. | |
| 2004/0018353 A1 | 1/2004 | Czaplicki et al. | |
| 2004/0034982 A1 | 2/2004 | Wieber et al. | |
| 2004/0046423 A1 | 3/2004 | Wieber | |
| 2004/0056472 A1 | 3/2004 | Schneider | |
| 2004/0076831 A1 | 4/2004 | Hable et al. | |
| 2004/0112531 A1 | 6/2004 | Bogert et al. | |
| 2004/0124553 A1 | 7/2004 | Czaplicki et al. | |
| 2004/0143969 A1 | 7/2004 | Czaplicki et al. | |
| 2004/0227377 A1 | 11/2004 | Gray | |
| 2004/0255546 A1 | 12/2004 | Sophiea et al. | |
| 2004/0256888 A1 | 12/2004 | Le Gall et al. | |
| 2004/0262810 A1 | 12/2004 | Barz et al. | |
| 2004/0262853 A1 | 12/2004 | Larsen et al. | |
| 2005/0012280 A1 | 1/2005 | Richardson | |
| 2005/0016807 A1 | 1/2005 | Braymand | |
| 2005/0081383 A1 | 4/2005 | Kosal et al. | |
| 2005/0082111 A1 | 4/2005 | Weber | |
| 2005/0087899 A1 | 4/2005 | Coon et al. | |
| 2005/0102815 A1 | 5/2005 | Larsen | |
| 2005/0126286 A1 | 6/2005 | Hable et al. | |
| 2005/0127145 A1 | 6/2005 | Czaplicki et al. | |
| 2005/0159511 A1 | 7/2005 | Kramer | |
| 2005/0159531 A1 | 7/2005 | Ferng | |
| 2005/0166532 A1 | 8/2005 | Barz | |
| 2005/0172486 A1 | 8/2005 | Carlson et al. | |
| 2005/0212326 A1 | 9/2005 | Marion | |
| 2005/0212332 A1 | 9/2005 | Sheldon et al. | |
| 2005/0217785 A1 | 10/2005 | Hable et al. | |
| 2005/0230165 A1 | 10/2005 | Thomas et al. | |
| 2005/0241756 A1 | 11/2005 | Harthcock et al. | |
| 2005/0249916 A1 | 11/2005 | Muto et al. | |
| 2005/0249936 A1 | 11/2005 | Ui et al. | |
| 2005/0251988 A1 | 11/2005 | Mendiboure | |
| 2005/0260399 A1 | 11/2005 | Finerman | |
| 2005/0269840 A1 | 12/2005 | Finerman et al. | |
| 2005/0279567 A1 | 12/2005 | Ito | |
| 2005/0285292 A1 | 12/2005 | Mendiboure et al. | |
| 2006/0000186 A1 | 1/2006 | Carlson et al. | |
| 2006/0006695 A1 | 1/2006 | Lutz et al. | |
| 2006/0008615 A1 | 1/2006 | Muteau et al. | |
| 2006/0019595 A1 | 1/2006 | Lewis et al. | |
| 2006/0020076 A1 | 1/2006 | Finerman et al. | |
| 2006/0021697 A1 | 2/2006 | Riley et al. | |
| 2006/0057333 A1 | 3/2006 | Brahim | |
| 2008/0093021 A1 | 4/2008 | Merz et al. | |
| 2009/0042013 A1 | 2/2009 | Finter et al. | |

FOREIGN PATENT DOCUMENTS

| | | |
|---|---|---|
| DE | 198 58 903 A1 | 6/2000 |
| EP | 0 236 291 A2 | 9/1987 |
| EP | 0 370 342 A2 | 5/1990 |
| EP | 0 383 498 A2 | 8/1990 |
| EP | 0 611 788 A2 | 8/1994 |
| EP | 0 995 668 A1 | 4/2000 |
| EP | 1 084 816 A2 | 3/2001 |
| EP | 1 031 496 B1 | 12/2001 |
| EP | 1 208 954 A2 | 5/2002 |
| EP | 1 256 512 A2 | 11/2002 |
| EP | 1 359 004 A1 | 11/2003 |
| EP | 1 591 224 A1 | 2/2005 |
| EP | 1265765 B2 | 4/2007 |
| FR | 2 749 263 A1 | 12/1997 |
| FR | 2817943 A3 | 6/2002 |
| GB | 2 083 162 A | 3/1982 |
| GB | 2 370 803 A | 6/2001 |
| GB | 2375328 A | 11/2002 |
| JP | 4-300716 A | 10/1992 |
| JP | 10-053156 A | 2/1998 |
| JP | 2001-048055 A | 2/2001 |
| JP | 2001-191949 A | 7/2001 |
| JP | 2002-012167 A | 1/2002 |
| WO | 89/06595 A1 | 7/1989 |
| WO | 97/02967 A1 | 1/1997 |
| WO | 97/43501 A1 | 11/1997 |
| WO | 98/36944 A1 | 8/1998 |
| WO | 99/61280 A1 | 12/1999 |
| WO | 00/12595 A1 | 3/2000 |
| WO | 00/13958 A1 | 3/2000 |
| WO | 00/20483 A2 | 4/2000 |
| WO | 00/37554 A1 | 6/2000 |
| WO | 00/39232 A1 | 7/2000 |
| WO | 00/40629 A1 | 7/2000 |
| WO | 00/40815 A1 | 7/2000 |
| WO | 00/46461 A1 | 8/2000 |
| WO | 01/19667 A1 | 3/2001 |
| WO | 01/88033 A1 | 11/2001 |
| WO | 02/26551 A | 4/2002 |
| WO | 02/055923 A2 | 7/2002 |
| WO | 02/074608 A1 | 9/2002 |
| WO | 03/042024 A1 | 5/2003 |
| WO | 03/061934 A1 | 7/2003 |
| WO | 2005/044630 A1 | 5/2005 |
| WO | 2007/082677 A1 | 7/2007 |

OTHER PUBLICATIONS

International Preliminary Report for corresponding PCT Application No. PCT/EP2007/000214, filed Jan. 11, 2007, (Published as WO/2007/082677, on Jul. 26, 2007).

International Search Report for corresponding PCT Application No. PCT/EP2007/000214, filed Jan. 11, 2007, (Published as WO/2007/082677, on Jul. 26, 2007).

Klein, M. and Adam Opel AG, "Application of Structural Foam in the Body in White—Reinforcement Roof Rail Side of the OPEL ASTRA," VDI Berichte, 2000, 227-249, Nr. 1543.

Hopton et al., Application of Structural Reinforcing Material to Improve Vehicle NVH Characteristics, 1999 IBEC Proceedings, Sep. 28-30, 1999, SAE Technical Paper Series 1999-01-3223, 1999.

Lilley et. al., Comparison of Preformed Acoustic Baffles and Two-Component Polyurethane Foams for Filling Body Cavities, 2001 Noise & Vibration Conference and Exhibition, Apr. 30-May 3, 2001, SAE Technical Paper Series 2001-01-1460, 2001.

Lilley et al., A Comparison of NVH Treatments for Vehicle Floor plan Applications, 2001 Noise & Vibration Conference and Exhibition, Apr. 30-May 3, 2001, SAE Technical Paper Series 2001-01-1464, 2001.

Lilley et al., Vehicle Acoustic Solutions, 2003 Noise & Vibration Conference and Exhibition, May 5-8, 2003, SAE Technical Paper Series 2003-01-1583, 2003.

Mansour et al., Optimal Bonding Thickness for Vehicle Stiffness, 2001 Noise & Vibration Conference and Exhibition, Apr. 30-May 3, 2001, SAE Technical Paper Series 2001-01-1469, 2001.

REINFORCEMENT OF HOLLOW PROFILES

CLAIM OF BENEFIT OF FILING DATE

The present application claims the benefit of the filing date of PCT Application Serial No. PCT/EP07/000,214, (filed Jan. 11, 2007) (published as WO 07/082,677) and GB 0600901.3 (filed Jan. 17, 2006), the contents of which are hereby incorporated by reference in their entirety for all purposes.

FIELD OF INVENTION

The present invention relates to improvements in or relating to the reinforcement of hollow profiles.

BACKGROUND OF THE INVENTION

Hollow profiles are used in many applications where strength is required. For example hollow profiles are used in automobiles, trucks and busses as part of the supporting sub frame, pillars and roof structures. Similarly hollow profiles are used in aircraft and shipping and in the construction industry.

It is also known to reinforce hollow profiles with ribbed structures positioned within the profile and in this way additional strength may be provided to the profile without requiring a dramatic increase in the weight of the profile. It has also been proposed that a heat foamable adhesive material may be provided on a reinforcing structure so that the structure may be inserted into the hollow profile and thereafter foamed by heating so that the material expands and bonds the structure to the under surface of the hollow profile. Furthermore it has been proposed that in automobile manufacturer the heat foamable material be such that it will foam at the temperatures experienced in the oven used to bake the anticorrosion coating typically applied to the metal frame of an automobile sometimes known as the "e-coat" process.

The previous proposals have however related to I beam structures such as those illustrated in PCT Publication WO 9743501 or to tubular hollow profiles such as those illustrated in EP 1265765. In these structures the foamable material is provided over a substantial surface area and which requires large amounts of foamable material in order to achieve a satisfactory bond between the reinforcing structure and the hollow profile. In addition these proposals rely upon the foam, once formed, to provide a contribution to the reinforcing effect.

Another form of reinforcement has been proposed in for example European Patent Applications 0370342 and 0995668 and French 2817943. In these proposals steel sections are overmoulded with polymeric ribbed structures and in many instances the polymeric material is nylon. However although nylon is a preferred polymeric material it will not adhere to steel sections and it is therefore necessary to provide mechanical interlocking between the overmoulded ribbed section and the steel such as the provision of holes or ribs in the steel around which the molten polymer can be injected in its molten state so that it will solidify to form a mechanical bond between the ribbed structure and the metal. This requires a complicated metal structure and the use of more polymer than is required for the reinforcing ribbed structure.

Vehicles require reinforcement for a variety of reasons. For example, vehicles can be reinforced against impact such as in a crash. However, even in crash reinforcement a variety of types of reinforcement may be required, different reinforcement being required for front impact, side impact, rear impact and rollover crash. In addition vehicles need to be reinforced against regular noise, vibration and harshness during regular working (sometimes known as NVH). The reinforcement needs to provide a combination of energy absorbing and energy dissipating functions depending upon the nature of the reinforcement required and the position in the vehicle that is to be reinforced and different structures are used to provide different types of reinforcement.

Vehicle body shells are generally assembled from hollow profiles generally metal structures consisting of longitudinal supporting structures, sometimes known as longits or rails. Transverse supporting structures of which there are usually at least three, front, middle and rear. Pillars for the doors and supporting the roof extending upwards from the longitudinal structures and frequently there are three pairs of pillars the A pillars at the front of the vehicle which pass upwards behind the engine compartment and contain the windscreen in its upper portion, the B pillars behind the front doors of the vehicle and the C pillars at the rear of the vehicle. Larger vehicles can have a larger number of pairs of pillars. Reinforcement is also provided within doors and also to support grooves at the front and the back of the vehicle.

Different areas of the vehicle require reinforcement for different reasons. For example the front of the longitudinal section and the A pillars require reinforcement against front crash but they also require stabilisation to remove vibration and hardness of driving. The centre of the longitudinal structures and the B pillars require reinforcement against side crash but also against front crash and to remove vibration and hardness during driving. The rear of the vehicle and the C pillars require reinforcement against rear crash and also against vibration and hardness during driving. The A, B and C pillars all require strengthening against roll over crash particularly at the top of the pillars. Overmoulded ribbed structures have been proposed for door reinforcement and roof supports.

It is important that the provision of the reinforcement be achieved within the normal vehicle assembly operations. One important operation in vehicle manufacture is the provision of an anti corrosion coating on the internal surfaces of the metal structures and this is often accomplished by what is know as the electrocoat (or e coat) process. In this process the assembled metal frame of the vehicle passes through a large bath of anti corrosion fluid which is deposited electrolytically on the metal and the coating formed is then cured by passing the coated metal structure through an oven where it is dried and hardened. Techniques have been developed whereby a reinforcing part comprising a carrier material which provides reinforcement carrying a heat activated adhesive foamable material is placed within the metal structure and the metal structure is subject to the e-coat process. The foamable material is designed so that it will foam and develop adhesive properties under the conditions employed for the drying and/or hardening of the anti corrosion coating. In this way the foamable material can be foamed after deposition of the anti-corrosion coating during the drying and curing of the coating. The foamed material therefore serves the dual function of adhering the carrier to the inner surface of the tubular structure so that the carrier can provide a reinforcing effect and also contributing to the reinforcement.

SUMMARY OF THE INVENTION

In one aspect, the present invention is directed to a structural reinforcement that includes a hollow profile and a ribbed structure that has ribs with ends and a heat activatable adhesive material that is provided over at least a part of ribs at one or more ends being juxtaposed to an interior surface of the hollow profile.

In another aspect the present invention is directed to A process for reinforcing a structure that includes the steps of providing a hollow profile and a ribbed structure having ribs with end, and a heat activatable adhesive material over at least a part of the ends of the ribs, inserting the ribbed structure within the hollow profile, and heating the hollow profile containing the ribbed structure to activate the adhesive material so that it bonds the ribbed structure thereto to the inner surface of the hollow profile. The heat activatable adhesive is an expandable adhesive material which is such that it will expand at the temperature employed in the e-coat oven and the hollow profile contains the ribbed structure with the expandable adhesive material in its unexpanded state is first subject to the e-coat anticorrosion treatment and then passes to an oven where the anticorrosion coating is baked and the expandable material expands in the oven so that it contacts the inner surface of the hollow profile and C bonds the ribbed structure thereto.

In another aspect, the present invention is directed to a process for overmoulding a structural reinforcement that includes the steps of providing a hollow profile having a heat activatable adhesive, placing the hollow profile in a mould, and overmoulding the hollow profile with a polymeric material. The heat activatable material is provided at locations such that to bond the overmoulded polymeric material to the hollow profile.

In yet another aspect, any of the aspects of the present invention may be further characterized by one or any combination of the following features: the hollow profile is formed of metal, a thermoplastic, or a composite, the hollow profile is formed of the thermoplastic that includes polyethylene, polypropylene, nylon, or any combination thereof, the hollow profile is formed of the thermoplastic material that includes a filler having glass fibre, carbon fibre, natural fibre, or any combination thereof the hollow profile is formed of a composite material that includes a laminar structure of two facing sheets with a layer of adhesive material that is foamable therebetween the ribbed structure is formed of metal, thermoplastic, or a composite, the ribs are formed of the composite material that includes a laminar structure of two facing sheets with a layer of foamable material between them, the adhesive material is a foamable material with a degree of expansion of from 60% to 200%. The foamable material is a solid epoxy resin, a liquid epoxy resin, or a combination of both, the heat activatable material is provided on the ends of the ribs by moulding onto the ribbed structure, the heat activatable material is provided on the ribs by extrusion in place, grooves are provided at certain points at the end of the ribs for the provision of the heat activatable material, the remainder of the ribs which are not provided with the heat activatable material will substantially contact the inner surface of the hollow profile in order to provide a reinforcing effect, the ribbed structure carrying the heat activatable material is provided with means for attachment within the hollow profile, the heat activatable adhesive is also a heat activatable expandable material, and the hollow profile is part of an automobile.

It should be appreciated that the above referenced aspects and examples are non-limiting as other exists with the present invention, as shown and described herein. For example, any of the above mentioned aspects or features of the invention may be combined to form other unique configurations, as described herein, demonstrated in the drawings, or otherwise.

DETAILED DESCRIPTION OF THE INVENTION

Figure 1:
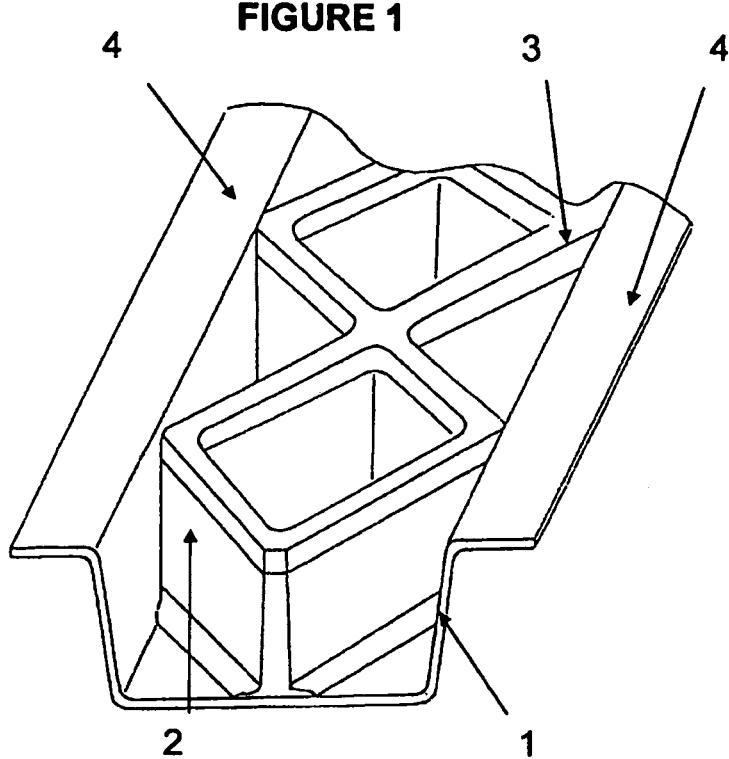
FIG. 1 illustrates a perspective view of a first embodiment according to the teachings of the present invention.

We have now found that such techniques may be used to overcome the problems previously described in relation to the overmoulding of metal, particularly steel, with polymeric reinforcing structures.

The present invention is concerned with structures comprising hollow profiles which are reinforced by a ribbed structure in which the ribs lie in a direction that is substantially perpendicular to the axis of the hollow profile and employs a heat activated adhesive to bond the ribs themselves to the inner surface of the hollow profile.

The present invention therefore provides a hollow profile reinforced with a ribbed structure wherein at least part of the ends of the ribs are bonded to the inner surface of the hollow profile by a heat activated adhesive material.

In a further embodiment the invention provides a ribbed structure for the reinforcement of a hollow profile wherein a heat activated adhesive material is provided over at least a part of the ends of the ribs.

In a further embodiment the invention provides a process for reinforcing a hollow profile in which a ribbed structure provided with a heat activatable adhesive material over at least a part of the ends of the ribs is placed within the hollow profile and the hollow profile containing the ribbed structure is heated to activate the adhesive material so that it bonds the ribbed structure to the inner surface of the hollow profile.

In a further embodiment the invention provides a process for overmoulding a hollow profile in which the hollow profile is provided with a heat activatable adhesive and is placed in a mould and is overmoulded with a polymeric material wherein the heat activatable material is provided at locations where it is desired to bond the overmoulded polymeric material to the hollow profile.

In a further embodiment the invention provides a process for the production of a reinforced dosed hollow profile in which an open hollow profile is overmoulded with a polymeric material and a heat activatable adhesive is provided on the overmoulding at locations where it is desire to bond the overmoulded structure to the cover for the hollow profile, the cover is provided on the hollow profile and the heat activatable adhesive is activated to bond the cover to the overmoulded structure.

In all embodiments it is preferred that the heat activatable adhesive is a foamable adhesive material.

In a further embodiment when the process is used in automobile manufacture the adhesive is a foamable adhesive material and is such that it will expand at the temperature employed in the e-coat oven and the hollow profile containing the ribbed profile with the expandable adhesive material in its unexpanded state is first subject to the e-coat anticorrosion treatment and then passes to an oven where the anticorrosion coating is baked and the expandable material expands in the oven so that it contacts the inner surface of the hollow profile and bonds the ribbed structure thereto.

The overmoulded structure is preferably a ribbed structure which may be of any desired structure and this will depend upon the nature and shape of the region to be reinforced and also the degree and type of reinforcement that is required. For example in automobile manufacture different types of reinforcement are required at different positions in the automobile. Reinforcement is required against front crash and rear crash where the hollow profile may be the rails and longitudinals of the frame. Reinforcement may also be required in the pillars against both front and side crash and in the roof and pillars against roll over. Reinforcement may be required in the doors or as support for the roof. Furthermore reinforcement may be required to reduce vibration of the vehicles during normal operation. The hollow profiles are shaped by the car designer to take this aspect into account as well as providing the desired appearance of the vehicle. The design of the rib reinforcing structure will be determined by the size and shape of the hollow profile and the reinforcing effect it is required to provide.

The hollow profile that is reinforced may be made of any suitable material and the choice of material will depend upon the use to which it is to be put. The profile may be metal and examples include steel or aluminium although other metals such as titanium may be used in specialised applications. When the profile is metal it is usually formed by stamping, rolling or by extrusion although hydroforming may be used. In automobile applications the profiles are typically formed from two metal pieces a U or C shaped profile and a cover which are joined together to form the hollow profile usually by welding. Typically the ribbed structure is attached to one of the metal pieces, perhaps by overmoulding and the cover then applied. Alternatively the profile may be of a synthetic material such as a thermoplastic and may then be formed by plastics moulding techniques such as extrusion, injection moulding or blow moulding. Rigid plastics such as polyethylene, polypropylene and nylons are particularly suitable as are those materials when they are filled with fillers such as glass fibre, carbon fibre or other natural fibres. The hollow profile may itself be manufactured from a composite material such as a laminar structure of two facing sheets with a layer of foamed material there between.

The overmoulded material may be any of the thermoplastic materials suggested as suitable for the hollow profile and the manufacturing techniques suggested for the manufacture of the hollow profile can be used for the manufacture of the ribbed structure. Nylon is particularly preferred as the overmoulded material. In one particular embodiment of the invention the ribs themselves are of a composite material comprising a laminar structure of two facing sheets with a layer of foamable material between them. In this way the foamable material can expand outwardly from the end of the ribs to bond the ribs to the inner surface of the outer profile.

The heat activatable adhesive material is provided on at least part of one or both of the ends of the ribs and the nature of the material will be chosen according to the function it is to perform. In the preferred embodiment where the activatable adhesive is a foamable material the material will be chosen according to the conditions under which it is required to cause the material to foam and set. It is preferred that the foamble material be such that when foamed it provides a structural reinforcing foam and examples of such foamable materials are epoxy based foams which may be derived from solid and/or liquid epoxy resins. The materials may also contain thermoplastics, fillers, blowing agents, cross linking agents and other materials.

It is also preferred that the heat activatable adhesive material be moulded onto the ribbed structure, alternatively it can be heat bonded to the ribbed structure or can be attached by a fastening system. Examples of suitable foamable material include foamable epoxy-base resins and examples of such materials are the products L5206, L5207, L5208 and L5209, which are commercially available from L & L Products of Romeo Mich. USA, and the Core Products 5204, 5206, 5205 and 5208 available from Core Products, Strasbourg, France. The product should be chosen so that it can be bonded to the ribbed structure at temperatures below that at which it will foam, typically 80° C. to 90° C. and also according to the rate of expansion and foam densities required. It is further preferred that it expand at the temperatures experienced in the oven used to dry and cure the anticorrosion coating deposited in the e-coat process, typically 120° C. to 210° C. Prior to activation, the expandable adhesive material is preferably dry and not tacky to the touch, since this facilitates shipping and handling and prevents contamination. In a preferred embodiment the foamable material will soften and bond at 80° C. to 90° C. and is applied to the ribbed structure when it is at a temperature of 85° C. to 110° C.

Where the material is to be used in automobile manufacture and is to be foamed in the e-coat bake oven it should be such that it foams and cures at a temperature in the range of 160° C. to 210° C. although the current trend is to employ lower temperatures.

The activatable adhesive material may be provided on the ends of the ribs by any suitable technique. For example it may be moulded onto the already formed rib structure in for example an injection moulding operation. Alternatively it can be extruded onto the rib structure which could be accomplished by co-extrusion with the rib structure or by extrusion in place. Such an extrusion in place may be performed using a robotic extrusion apparatus. Alternatively the material may be cut to the appropriate shape and size and then attached to the end of the rib either by an adhesive, by hot bonding or by mechanical attachment.

It is not necessary that the entire surface of the ends of the ribs be provided with the adhesive material although this is preferred. The extent of surface cover will depend on the degree of bonding that is required. It may be that grooves will be provided at certain points at the end of the ribs for the provision of the material so that the remainder of the ribs which are not provided with the material will substantially contact the inner surface of the hollow profile in order to provide their reinforcing effect. In the preferred embodiment where the adhesive is a foamable material the thickness of the foamable material that is required and the degree of expansion required will depend upon the application. However, when used in automobile manufacture a sufficient gap should exist between the unfoamed material and the inner surface of the hollow profile to allow the e-coat fluid to flow readily through the gap and coat the metal surfaces. Typically a gap of up to about 6 millimeters is required and the foam should therefore be such that it can expand across such a gap and provide a rigid bond between the ribbed structure and the inner surface of the metal profile. Typically structural reinforcing foams have a degree of expansion of from 60% to 200% more typically 90% to 150%. The foamable material may be provided at one or both ends of the ribs of the ribbed structure but it is preferred that it be provided at both ends.

In a further embodiment of the present invention the ribbed structure carrying the foamable material is provided with means for attachment within the hollow profile. These means are particularly useful in automobile manufacture where they may be such that they will hold the ribbed structure away from the inner surfaces of the hollow profile to allow the e-coat fluid to flow between the ribbed structure and the inner surfaces of the hollow profile. The means of attachment may be bolts or clips which can align with holes in the hollow profile. Alternatively the hollow profile may be provided with means that attach to the ribbed structure.

The present invention is illustrated by reference to the accompanying drawings in which FIG. 1 shows a steel U shaped profile (1) containing a ribbed reinforcing structure (2) provided with a foamable material (3) at the ends of the ribs. In operation a steel cover would be placed over the open mouth of the U shaped profile and welded to the flanges (4) of the profile. The structure could then be heated so that the foamble material expands and bonds the ribbed structure to the inner surface of the metal profile.

Figure 2:
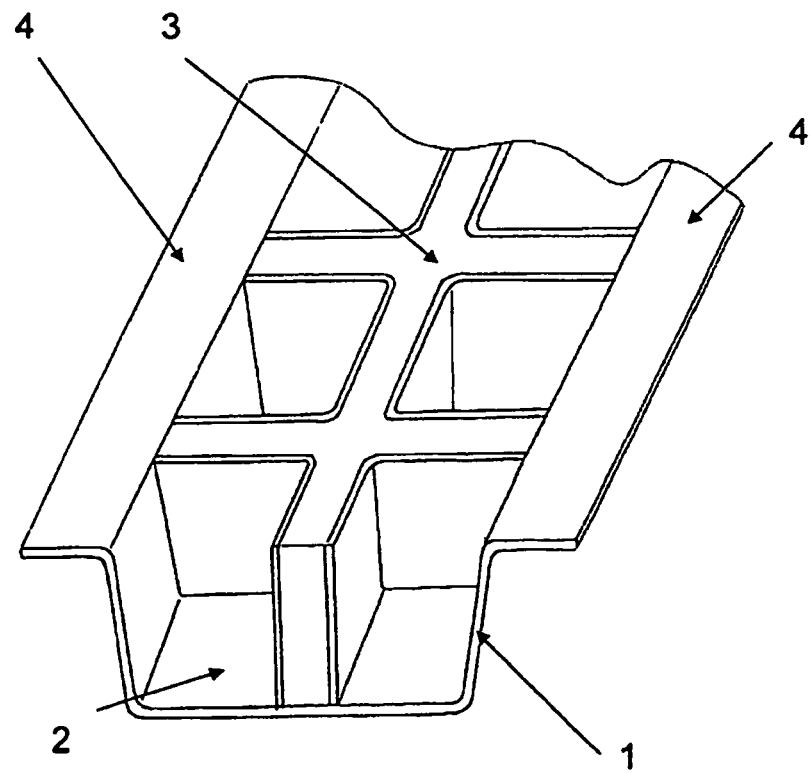
FIG. 2 illustrates a perspective view of a second embodiment according to the teachings of the present invention.
Figure 3:
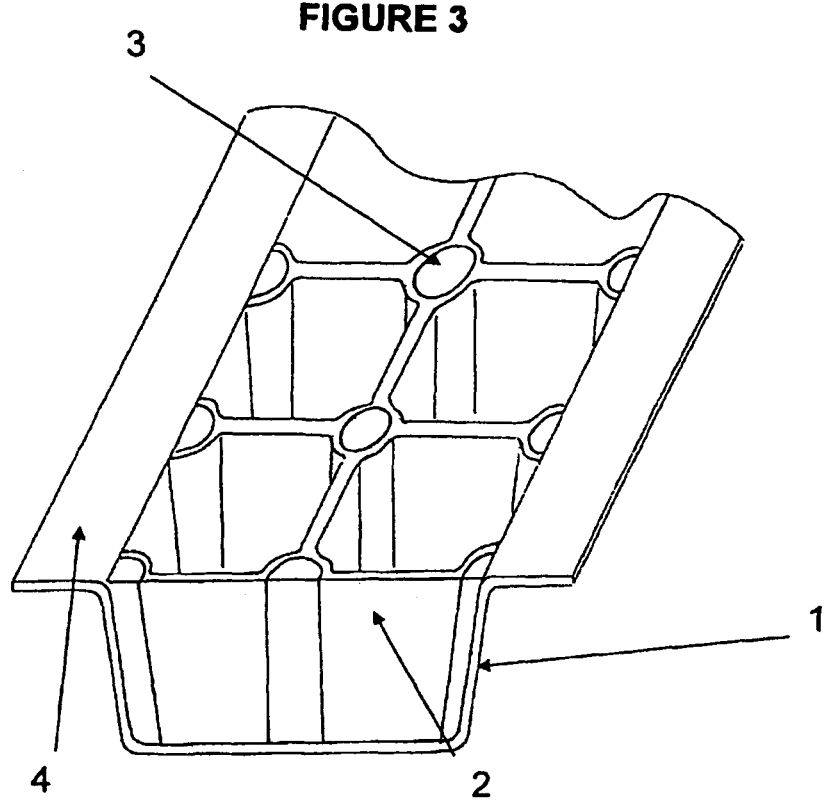
FIG. 3 illustrates a perspective view of a third embodiment according to the teachings of the present invention.
Figure 4:
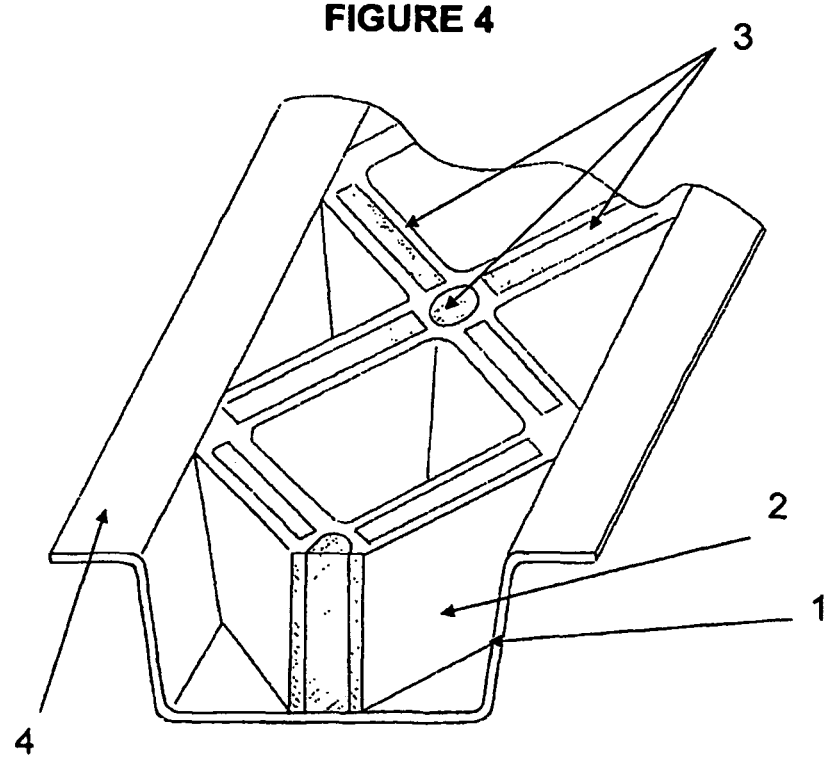
FIG. 4 illustrates a perspective view of a fourth embodiment according to the teachings of the present invention.

FIGS. 2, 3 and 4 show alternate designs in which the ribs are composite materials of two surface layers and an inner layer of the foamble material. In FIG. 3 the foam is present only at the intersection of the ribs. In this embodiment the surface layers for the ribs can be nylon, glass or carbon fibre matt or aluminium.

Figure 5:
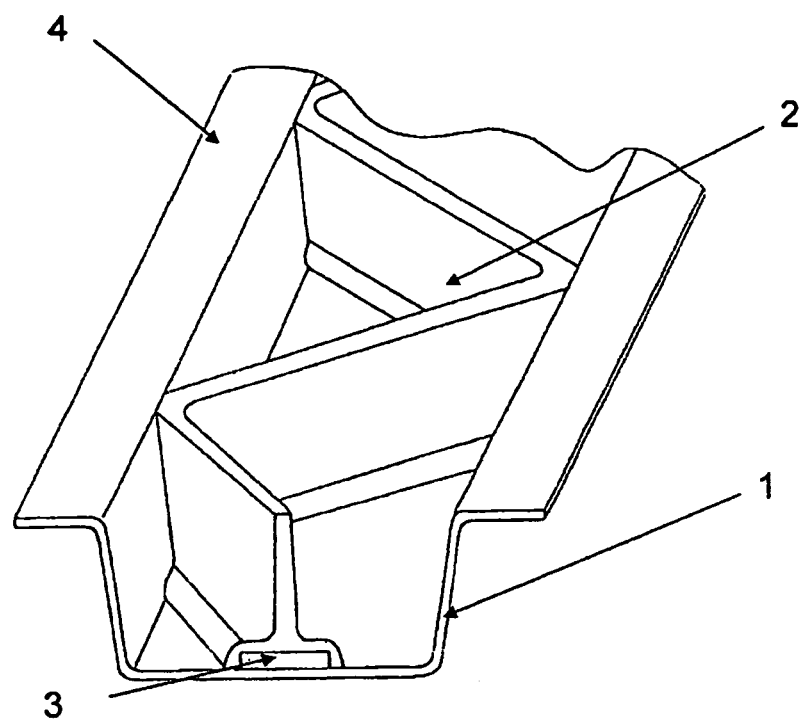
FIG. 5 illustrates a perspective view of a fifth embodiment according to the teachings of the present invention.
Figure 6:
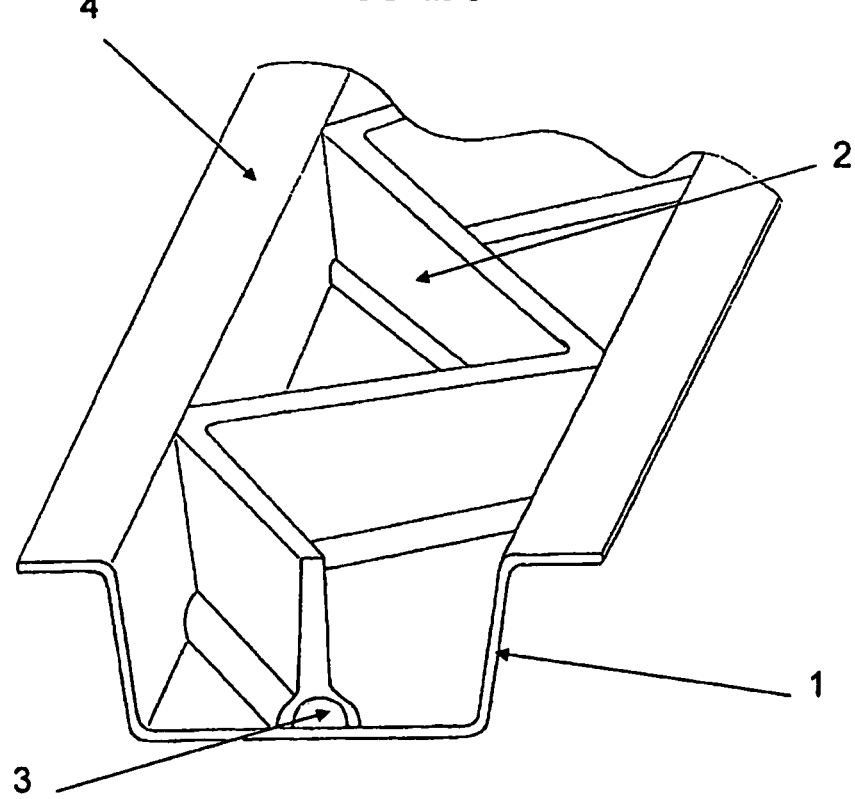
FIG. 6 illustrates a perspective view of a sixth embodiment according to the teachings of the present invention.

FIGS. 5 and 6 show a system in which strips of foam are provided on the end of a rib. These can be provided by overmoulding, extrusion in place or with a mechanical attachment.

Figure 7:
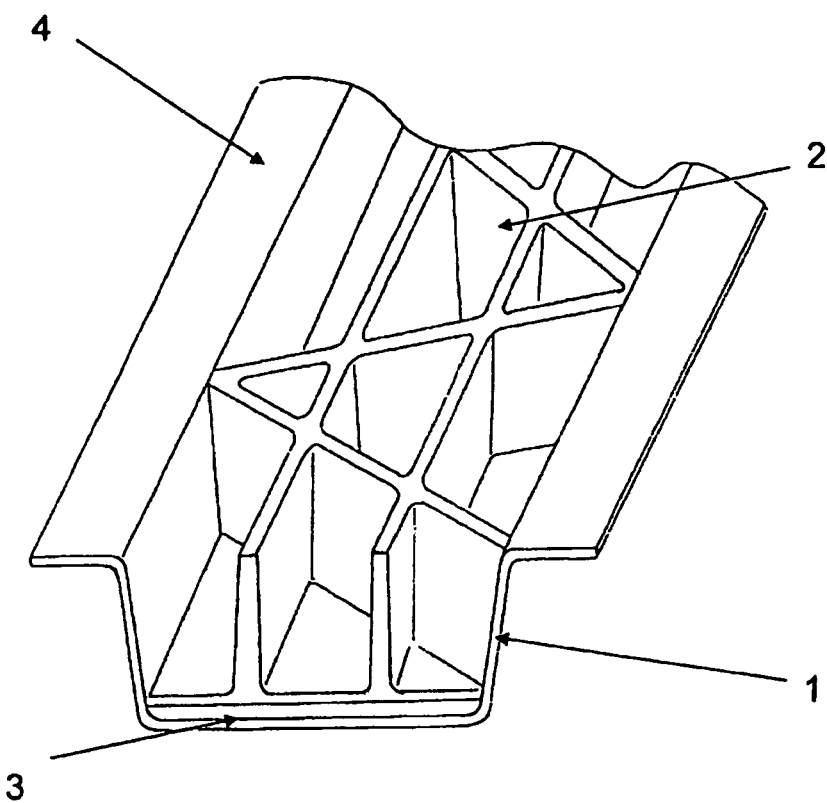
FIG. 7 illustrates a perspective view of a seventh embodiment according to the teachings of the present invention.

FIG. 7 shows a system in which the rib structure is provided by overmoulding a layer of foamable material with the ribbed structure.

Figure 8:
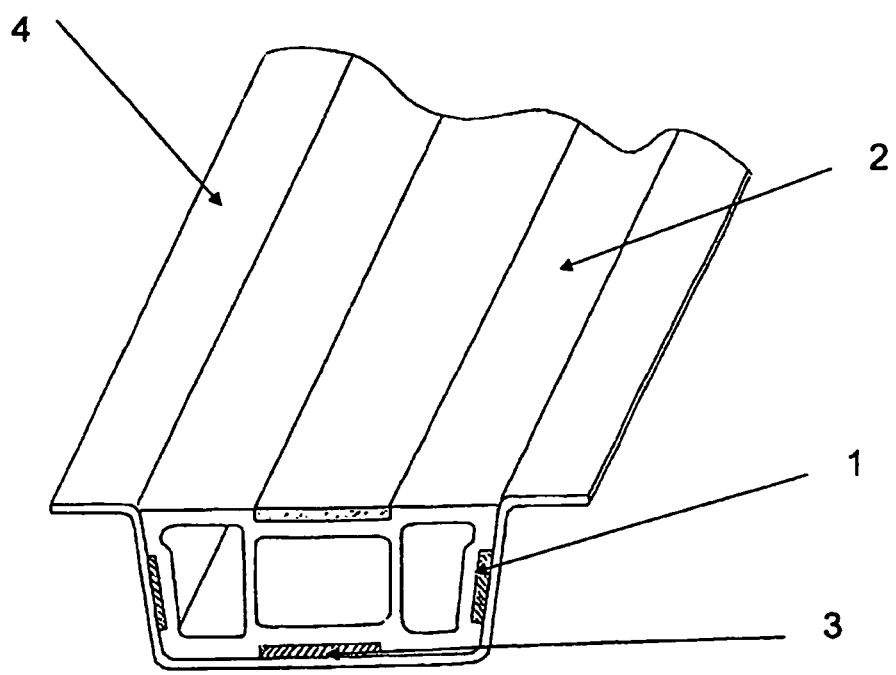
FIG. 8 illustrates a perspective view of an eighth embodiment according to the teachings of the present invention.

FIG. 8 shows a system in which the foamable material is provided as an extruded profile.

Figure 9:
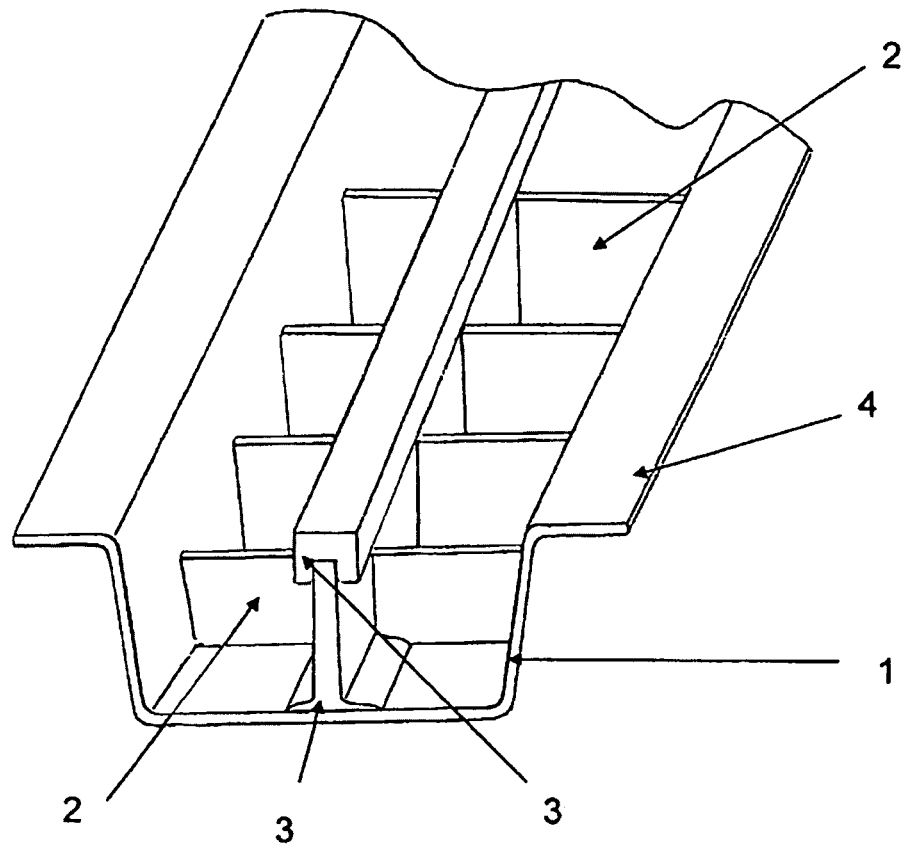
FIG. 9 illustrates a perspective view of a ninth embodiment according to the teachings of the present invention.

FIG. 9 shows a system in which the foamable material serves the dual function of bonding the ribs to the metal surface and also enhances the bond between the pieces of metal that make the hollow profile.

The invention claimed is:

1. A structural reinforcement system comprising a metal hollow profile and a thermoplastic ribbed structure, the thermoplastic ribbed structure including a laminar structure of two facing sheets with a first adhesive material that is foamable and located in between the two facing sheets, the ribbed structure including ribs with one or more terminating ends of each rib and a second adhesive material that is provided over at least a portion of the ribs at the one or more terminating ends to bond the one or more terminating ends to an interior surface of the hollow profile, wherein:
   i. the first and second adhesive materials are both foamable materials with a degree of expansion of from 60% to 200%;
   ii. the foamable materials include a solid epoxy resin, a liquid epoxy resin, or a combination of both;
   iii. the foamable materials both foam at a temperature in the range of 120° C. to 210° C.; and
   iv. the second adhesive material is provided on the ends of the ribs to bond the ribbed structure to the profile.

2. The structural reinforcement system of claim 1, wherein the second adhesive material is provided on the ribs by extrusion in place.

3. The structural reinforcement system of claim 1, wherein grooves are provided along portions of the one or more terminating ends of each of the ribs for receiving the second adhesive material.

4. The structural reinforcement system of claim 3, wherein a portion of the terminating ends of each of the ribs are not provided with the second adhesive material and contact the inner surface of the hollow profile.

5. The structural reinforcement system of claim 1, wherein the ribbed structure carrying the second adhesive material includes a fastener for attachment to a wall of the hollow profile.

6. The structural reinforcement system of claim 1, wherein the second adhesive is a heat activatable material.

7. The structural reinforcement system of claim 1, wherein the second adhesive material is heat activatable to both foam and develop adhesive properties at a temperature in the range 120° C. to 210° C.

8. The structural reinforcement system of claim 1, wherein the hollow profile includes a polymeric overmoulding material.

9. The structural reinforcement system of claim 1, wherein the hollow profile includes a hollow section and a cover.

10. The structural reinforcement system of claim 8, wherein the polymeric material is connected to the hollow profile by the second adhesive material.

* * * * *